(12) United States Patent
Shirataki et al.

(10) Patent No.: US 8,434,605 B2
(45) Date of Patent: May 7, 2013

(54) ONE-WAY CLUTCH OF ROLLER TYPE FOR STARTER OF MOTOR BIKE

(75) Inventors: Hirobumi Shirataki, Fukuroi (JP);
Tomoharu Ando, Fukuroi (JP);
Yasuhide Takasu, Fukuroi (JP); Shinya Okuma, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 572 days.

(21) Appl. No.: 12/478,807

(22) Filed: Jun. 5, 2009

(65) Prior Publication Data

US 2009/0301257 A1 Dec. 10, 2009

(30) Foreign Application Priority Data

Jun. 6, 2008 (JP) .................................. 2008-148984

(51) Int. Cl.
*F16D 41/067* (2006.01)

(52) U.S. Cl.
USPC .................................. 192/45.016; 192/89.2

(58) Field of Classification Search .................. 192/45, 192/89.2, 45.016; 188/82.84
See application file for complete search history.

(56) References Cited

U.S. PATENT DOCUMENTS

| | | | |
|---|---|---|---|
| 1,708,215 A | 4/1929 | Chryst | |
| 2,843,238 A | 7/1948 | Rozner | |
| 2,902,125 A * | 9/1959 | House et al. | 192/45 |
| 3,011,606 A * | 12/1961 | Ferris et al. | 192/45 |
| 3,166,169 A | 1/1965 | Wade et al. | |
| 3,190,417 A | 6/1965 | Bacon | |
| 3,547,238 A | 12/1970 | Harmon | |
| 3,656,591 A | 4/1972 | Marland et al. | |
| 3,718,212 A | 2/1973 | Havranek | |
| 4,724,940 A | 2/1988 | Lederman | |
| 4,932,508 A | 6/1990 | Lederman | |
| 4,986,402 A | 1/1991 | Neuwirth et al. | |
| 4,995,490 A | 2/1991 | Kanai | |
| 5,074,393 A | 12/1991 | Itomi | |
| 5,271,486 A | 12/1993 | Okamoto et al. | |

(Continued)

FOREIGN PATENT DOCUMENTS

| | | |
|---|---|---|
| CN | 1592667 A | 3/2005 |
| DE | 29 28 587 A1 | 1/1981 |

(Continued)

OTHER PUBLICATIONS

Office Action issued Apr. 16, 2012 in Japanese Patent Application No. 2008-148984.

(Continued)

*Primary Examiner* — Richard M. Lorence
(74) *Attorney, Agent, or Firm* — Miles & Stockbridge P.C.

(57) ABSTRACT

A one-way clutch of roller type comprises an outer race having pockets provided at their inner peripheries with cam surfaces, an inner race arranged in an inner diameter side of the outer race coaxially, a plurality of rollers disposed in the pockets and adapted to transmit torque between the outer race and the inner race when engaged by the cam surfaces, and accordion springs disposed in the pockets between the outer race and the rollers and having one ends secured to an axial end face of the outer race and adapted to bias the rollers toward engagement directions with respect to the cam surfaces, and the axial end face of the outer race is provided with a discriminating area to which the accordion springs are secured, and the discriminating area is capable of being discriminated from the other areas.

8 Claims, 2 Drawing Sheets

U.S. PATENT DOCUMENTS

| | | | |
|---|---|---|---|
| 5,279,400 A | 1/1994 | Riggle et al. | |
| 5,328,010 A | 7/1994 | Lederman | |
| 5,343,991 A | 9/1994 | Premiski et al. | |
| 5,647,800 A | 7/1997 | Warnke et al. | |
| 5,704,458 A | 1/1998 | Neuwirth et al. | |
| 5,842,548 A | 12/1998 | Sato et al. | |
| 5,941,355 A | 8/1999 | Iga | |
| 6,003,799 A | 12/1999 | Jung | |
| 6,374,974 B1 | 4/2002 | Wake | |
| 6,796,413 B2 * | 9/2004 | Fukui et al. | 192/42 |
| 6,848,552 B2 | 2/2005 | Miller | |
| D586,832 S | 2/2009 | Shirataki et al. | |
| 7,740,118 B2 | 6/2010 | Shirataki et al. | |
| 8,002,096 B2 | 8/2011 | Shirataki | |
| 8,037,986 B2 | 10/2011 | Takasu | |
| 8,042,671 B2 | 10/2011 | Kinoshita | |
| 8,162,114 B2 | 4/2012 | Shirataki et al. | |
| 2003/0085092 A1 | 5/2003 | Fukui et al. | |
| 2004/0139743 A1 | 7/2004 | Sato | |
| 2005/0034951 A1 | 2/2005 | Takasu | |
| 2007/0246318 A1 | 10/2007 | Shirataki et al. | |
| 2007/0251794 A1 | 11/2007 | Shirataki et al. | |
| 2008/0196995 A1 | 8/2008 | Mikami et al. | |
| 2009/0242346 A1 | 10/2009 | Kinoshita | |
| 2009/0277739 A1 * | 11/2009 | Takasu | 192/45 |
| 2010/0084239 A1 | 4/2010 | Ando | |
| 2010/0096235 A1 | 4/2010 | Shirataki et al. | |
| 2010/0096236 A1 | 4/2010 | Ando | |
| 2010/0101910 A1 | 4/2010 | Ando | |
| 2010/0108455 A1 | 5/2010 | Shirataki et al. | |
| 2010/0116611 A1 | 5/2010 | Shirataki et al. | |
| 2010/0213021 A1 | 8/2010 | Shirataki | |
| 2010/0258398 A1 | 10/2010 | Shirataki et al. | |
| 2010/0314211 A1 | 12/2010 | Shirataki et al. | |

FOREIGN PATENT DOCUMENTS

| | | |
|---|---|---|
| EP | 0 237 243 A1 | 9/1987 |
| JP | 05-044615 A | 2/1993 |
| JP | 08-061192 | 3/1996 |
| JP | 10-009292 A | 1/1998 |
| JP | 2003-148518 A | 5/2003 |
| JP | 2003-172377 A | 6/2003 |
| JP | 2004-346951 A | 12/2004 |
| JP | 2005-172181 A | 6/2005 |
| JP | 2006-275219 A | 10/2006 |
| JP | 2007-064475 A | 3/2007 |
| JP | 2007-278426 A | 10/2007 |
| JP | 2008-138712 A | 6/2008 |
| JP | 2008-138723 A | 6/2008 |
| TW | 354820 | 3/1999 |
| TW | 1264503 B | 10/2006 |
| TW | 200801364 A | 1/2008 |
| WO | WO 03/047809 A1 | 6/2003 |
| WO | WO 2008/047457 A1 | 4/2008 |

OTHER PUBLICATIONS

Office Action issued May 10, 2012, in U.S. Appl. No. 12/680,376.
Office Action issued Aug. 6, 2010 in Taiwan Patent Application No. 097110807.
Office Action issued May 21, 2012 in Japanese Patent Application No. 2008-279407.
Office Action issued May 21, 2012 in Japanese Patent Application No. 2008-267227.
Office Action issued May 21, 2012 in Japanese Patent Application No. 2008-258675.
Office Action dated May 14, 2012 in Chinese Appln. No. CN 200880127624.2.

* cited by examiner

ONE-WAY CLUTCH OF ROLLER TYPE FOR STARTER OF MOTOR BIKE

This application claims priority from Japanese Patent Application No. 2008-148984 filed Jun. 6, 2008, which is hereby incorporated by reference herein.

BACKGROUND OF THE INVENTION

1. Field of the Invention

The present invention relates to a one-way clutch of roller type used as a torque transmitting element or a back stop in a driving apparatus of a motor vehicle, an industrial machine and the like, for example.

2. Related Background Art

In general, a one-way clutch of roller type is comprised of an outer race, an inner race disposed in concentric with the outer race, a plurality of rollers disposed between an outer peripheral surface of the inner race and inner peripheral cam surfaces of the outer race and adapted to transmit torque, and springs contacted with idle rotation sides of the rollers.

With this arrangement, in the one-way clutch, the inner race is designed so as to be rotated only in one direction with respect to the outer race by means of a cam mechanism constituted by the rollers and the cam surfaces. That is to say, the inner race is designed so that it is idly rotated relative to the outer race in one direction, and on the other hand, it applies rotational torque to the outer race via the cam mechanism only in an opposite direction.

In the one-way clutch of roller type, to obtain positive engagement, rollers as torque transmitting members and accordion springs for biasing the rollers are disposed in respective pockets provided in the outer race or the inner race.

In particular, in a one-way clutch of roller type of a motor bike, since the number of rollers is small (for example, three to six), if the respective rollers are not engaged positively, a design torque capacity may not be maintained. In the prior arts, to prevent the rollers and the accordion springs from being dislodged in an axial direction, in many cases, side plate or plates is/are provided at axial one side or both sides of the one-way clutch of roller type.

For example, in Japanese Patent Application Laid-open No. 2007-64475, side plates or covers are provided on a one-way clutch of roller type, and a projection is formed on either side plate, thereby preventing accordion springs from being dislodged in an axial direction.

In order to enhance a quality of the one-way clutch of roller type, it is necessary to reduce fluctuation of a relative position of the accordion spring with respect to the outer race, and it is desired that the accordion spring is not slid against an inner diameter portion of the outer race, an outer diameter portion of a holder or a track surface of the inner race, thereby preventing the accordion spring from being damaged due to a sliding movement and/or wear. To achieve this, it is sought that the accordion spring is positively secured to a predetermined portion of the outer race.

Further, since foreign matters accumulated in the one-way clutch of roller type affect a bad influence upon engaging performance of the one-way clutch, it is desirable to remove such foreign matters. To achieve this, it is sought that the side plates are eliminated and pockets are exposed in the axial direction. Further, an inexpensive one-way clutch of roller type for a starter is needed.

SUMMARY OF THE INVENTION

Accordingly, an object of the present invention is to provide a one-way clutch of roller type in which accordion springs can be attached to an outer race correctly, and enhancement of engaging reliability and reduction in cost can be achieved simultaneously.

To achieve the above object, the present invention provides a one-way clutch of roller type comprising an outer race having pockets provided at their inner peripheries with cam surfaces, an inner race arranged in an inner diameter side of the outer race coaxially, a plurality of rollers disposed in the pockets and adapted to transmit torque between the outer race and the inner race when engaged by the cam surfaces, and accordion springs disposed in the pockets between the outer race and the rollers and having one ends secured to an axial end face of the outer race and adapted to bias the rollers toward engagement directions with respect to the cam surfaces, and wherein the axial end face of the outer race is provided with a discriminating area to which the accordion springs are secured, and the discriminating area is capable of being discriminated from the other areas.

Further, preferably, the discriminating area is constituted by an area formed at an inner diameter side of the axial end face of the outer race and disposed in concentric with a rotational axis of the outer race, and the accordion spring is secured within the area.

Preferably, the discriminating are is formed as a recessed portion.

Preferably, the accordion spring is secured to the outer race by spot welding.

Preferably, there is provided a holder comprising a cylindrical portion having windows for holding the rollers, and a flange portion extending from the cylindrical portion radially outwardly and adapted to be engaged by a stepped portion provided at an inner diameter side of the outer race opposite to the axial end face, the holder being rotatable relative to the outer race.

According to the one-way clutch of roller type of the present invention, the following effects can be obtained.

By providing, on the end face of the outer race to which the accordion springs are secured, the discriminating area (mark) capable of discriminating the position where the accordion springs are secured to the outer race, it is possible to facilitate to attach the accordion springs to predetermined fixed positions of the outer race. Further, after the securing, it is possible to facilitate to judge whether the accordion spring is secured to the predetermined position or not, thereby contributing enhancement of quality of the article.

By securing the accordion springs to the end face of the outer race, the accordion springs can be prevented from being dislodged in the axial direction, thereby eliminating side plates for preventing the accordion springs from being dislodged in the axial direction. Thus, reduction in cost can be realized.

Further, since the relative position of the accordion spring relative to the outer race is not fluctuated, the accordion spring is not slid against the inner diameter portion of the outer race, outer diameter portion of the holder and track surface of the inner race, thereby preventing the damage of the accordion spring due to the sliding movement.

Since the one-way clutch of roller type used as a starter of a motor bike is used under a high speed rotation and great vibration condition and a condition in which environment regarding powder dust is severe, dust including worn powder is apt to be accumulated in the one-way clutch of roller type. According to the present invention, since the side plates can be eliminated, the pockets are exposed, thereby enhancing a dust discharging ability.

Further features of the present invention will become apparent from the following description of exemplary embodiment with reference to the attached drawings.

DETAILED DESCRIPTION OF THE INVENTION

Now, embodiments of the present invention will be fully explained with reference to the accompanying drawings. Incidentally, it should be noted that the embodiments which will be described below are merely examples and other alterations and modifications can be made.

Figure 1:
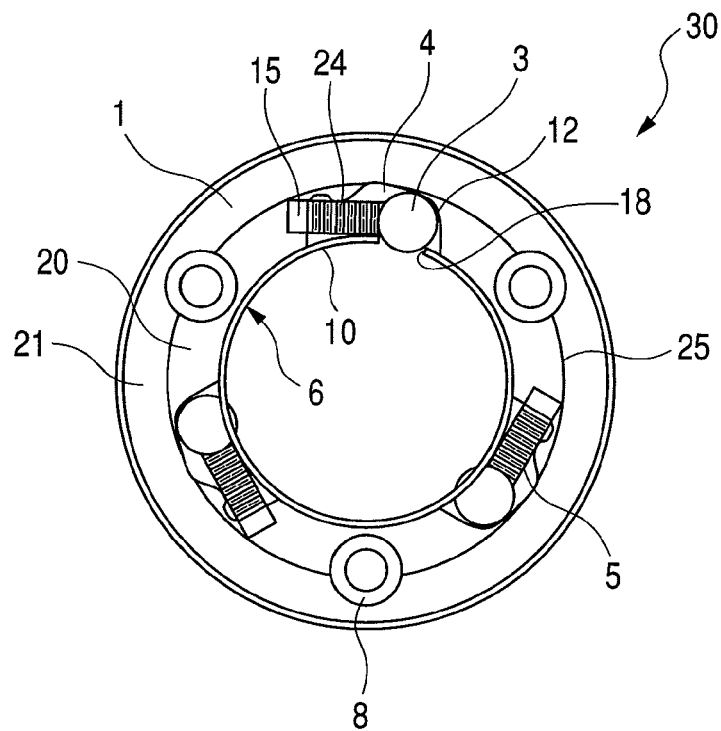
FIG. 1 is a front view showing a one-way clutch of roller type according to an embodiment of the present invention.

FIG. 1 is a front view showing a one-way clutch of roller type according to an embodiment of the present invention. FIG. 1 shows a condition that rollers are engaged by cam surfaces, i.e. a condition that the one-way clutch is locked. From this condition, when an outer race is rotated in a clockwise direction in FIG. 1, the one-way clutch is unlocked so that it can be idly rotated.

As shown in FIG. 1, a one-way clutch 30 of roller type comprises an annular outer race 1 provided at its inner periphery with pockets 4 formed as recesses having cam surfaces 12, an inner race 2 (refer to FIG. 4; not shown in FIGS. 1 to 3) spaced inwardly from the outer race 1 in a radial direction and rotatable relative to the outer race and disposed in concentric with the outer race and having an annular outer peripheral track surface 11, and a plurality of rollers 3 disposed in the pockets 4 and adapted to transmit torque between the outer peripheral track surface 11 of the inner race 2 and the cam surfaces 12.

There are three pockets 4 provided at the inner diameter side of the outer race 1, which pockets are disposed equidistantly along a circumferential direction. Further, three stepped rivet holes 8 used for securing the outer race 1 to an associated member (not shown) and extending through the outer race in an axial direction are also disposed equidistantly along the circumferential direction. As shown in FIG. 1, the pockets 4 and the rivet holes 8 are arranged alternately and equidistantly along the circumferential direction. Further, it should be noted that the number of the pockets 4 can be set to be three to six, for example, in accordance with the magnitude of the torque.

As shown in FIG. 1, the one-way clutch 30 includes a holder 6 for holding the rollers 3, and the holder 6 has a cylindrical portion 10 and an annular flange portion 17 extending radially outwardly from an axial one end of the cylindrical portion 10. Further, the holder 6 has windows 18 extending therethrough in the radial direction, the number of which corresponds to the number of the rollers 3.

Each window 18 provided in the cylindrical portion 10 of the holder 6 extends through the cylindrical portion completely in the radial direction, but, in the axial direction, both ends of the window near the flange portion 17 and remote from the flange portion 17 are closed. That is to say, the roller 3 is seated in a substantially rectangular window 18 and is supported by four sides of the window 18.

Figure 2:
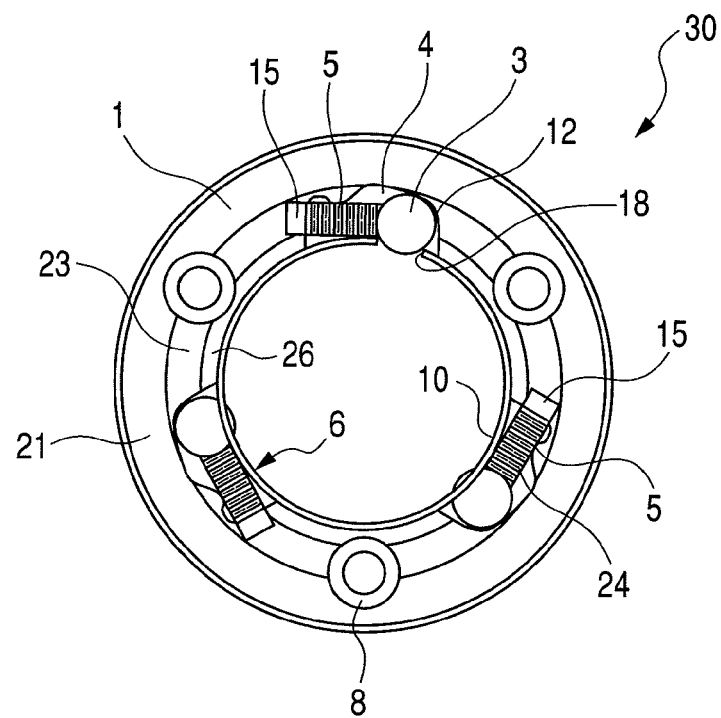
FIG. 2 is a front view showing a one-way clutch of roller type according to another embodiment of the present invention.
Figure 3:
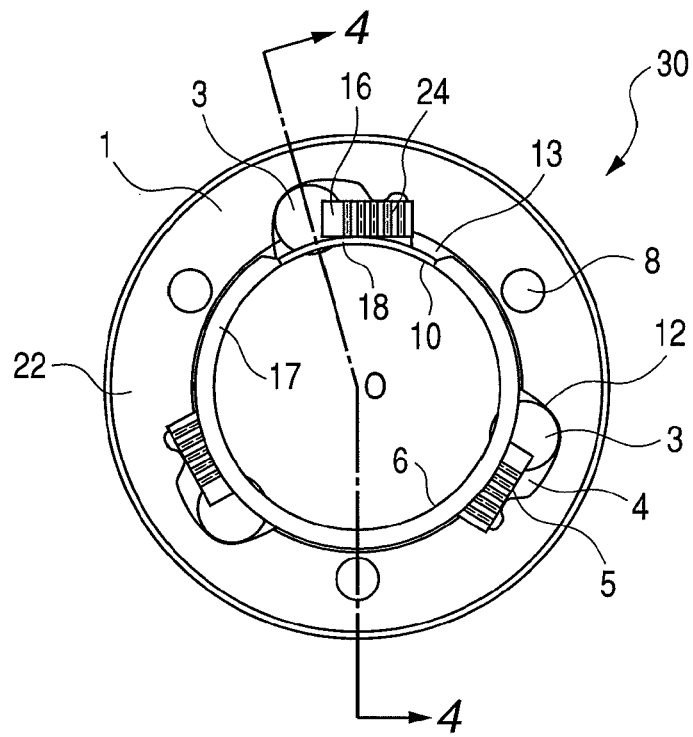
FIG. 3 is a partially broken front view showing the one-way clutch of roller type of FIGS. 1 and 2, looked at from an opposite side in an axial direction.
Figure 4:
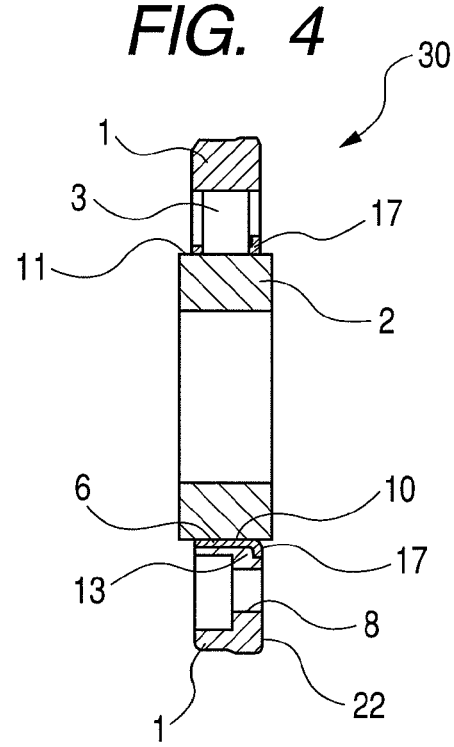
FIG. 4 is an axial sectional view taken along the line 4-O-4 in FIG. 3.

FIG. 3 is a partially broken front view showing the one-way clutch 30 of roller type of FIGS. 1 and 2, looked at from an opposite side in the axial direction. Further, FIG. 4 is an axial sectional view taken along the line A-O-A in FIG. 3. As shown in FIGS. 3 and 4, an annular stepped portion 13 is provided on an axial edge portion of the inner peripheral surface of the outer race 1, and the flange portion 17 of the holder 6 is engaged by the stepped portion 13. An axial depth of the stepped portion 13 is slightly greater than a thickness of the flange portion 17 so that, when the flange portion 17 is engaged by the stepped portion 13, a slight clearance is generated between an axial end face 22 of the outer race 1 (end face opposite to an axial end face 21 in FIGS. 1 and 2) and an axial end face of the flange portion 17, thereby preventing interference to the associated member. Further, an outer diameter of the stepped portion 13 is slightly greater than an outer diameter of the flange portion 17 of the holder 6 so that the flange portion 17 is fitted in the stepped portion 13 with a predetermined clearance. In this way, the holder 6 can be rotated relative to the outer race 1.

Further, as shown in FIGS. 1 to 4, the one-way clutch 30 of roller type includes accordion springs 5 disposed in the corresponding pockets 4 and adapted to bias the rollers 3 toward engagement directions with respect to the cam surfaces 12.

One end i.e. tab 15 of each accordion spring 5 is locked to the axial end face 21 of the outer race 1, as shown in FIGS. 1 and 2. Further, the other end 16 of the accordion spring 5 holds an axial end face of the roller 3, as shown in FIG. 3.

As shown in FIGS. 1 to 3, the accordion spring 5 includes a bellows portion 24 in the form of a bellows bent in the axial direction of the accordion spring 5. The bellows portion 24 can be expanded and contracted so as to apply a biasing force to the roller 3 so that the roller 3 is engaged by the cam surface 12.

The tab 15 of the accordion spring 5 is secured to the axial end face 21 of the outer race 1, for example, by welding, spot welding, bonding, soldering or the like.

Now, the securing of the accordion spring 5 to the outer race 1 will be fully explained. In FIG. 1, the axial end face 21 of the outer race 1 is provided at its inner diameter side with a discriminating area 20 by which the user can recognize positions where the accordion springs 5 are secured. As shown in FIG. 1, the discriminating area 20 is provided in the form of a substantially ring and can be discriminated from the other areas of the axial end face 21.

The discriminating area 20 is positioned at the inner diameter side of the axial end face 21 of the outer race 1 in concentric with a rotation axis of the outer race 1, and the tabs 15 of the accordion springs 5 are positioned and secured within the discriminating area 20.

The discriminating area 20 is formed as follows. When the axial end face 21 of the outer race 1 to which the accordion springs 5 are secured is cut, the cutting operation is started from the outer diameter side, and, when the cutting operation reaches the discriminating area 20 to which the accordion springs 5 are secured, a rotational speed and a radial shifting speed of a cutting tool (not shown) are decreased, thereby changing roughness of the cut surface. Thus, since there is a difference in surface roughness between the discriminating area 20 and the other areas of the axial end face 21 separated from the discriminating area by an annular border portion 25, the discriminating area 20 can be recognized visually or tactually.

FIG. 2 is a front view showing a one-way clutch of roller type according to another embodiment of the present invention. Since a fundamental construction of this embodiment is similar to the embodiment shown in FIG. 1, only differences will be explained. In the embodiment shown in FIG. 2, a discriminating area 20 is formed as an annular recessed portion 23.

Although the recessed portion 23 is formed at an inner diameter side of the axial end face 21 of the outer race 1, at an innermost diameter side, there remains an annular inner diameter portion 26 having the same height as that of the axial end face 21. Accordingly, the recessed portion 23 is formed as a groove between the outer diameter side of the axial end face 21 and the inner diameter portion 26.

A radial width of the recessed portion 23 is equal to a dimension into which the tab 15 of the accordion spring 5 is just fitted. Further, a depth of the recessed portion 23 is slightly greater than a thickness of the tab 15 of the accordion spring 5 so that, when the tab 15 is secured in the recessed portion 23, a slight clearance is generated between the axial end face 21 of the outer race 1 and an axial end face of the tab 15, thereby preventing interference to the associated member.

Also in another embodiment shown in FIG. 2, since the recessed portion 23 as the discriminating area to which the accordion springs 5 are attached or secured can easily be discriminated or recognized visually or the like, the accordion springs 5 can be secured to the correct positions.

In the above-mentioned embodiment, while examples that the discriminating area is formed as the annular shape were explained, the discriminating area can be formed as other shapes such as spot shape.

According to the embodiments of the present invention mentioned above, by providing the discriminating area (mark) capable of discriminating the positions where the accordion springs are secured to the outer race on the end face of the outer race to which the accordion springs are secured, it is easy to attach the accordion springs to the predetermined fixed positions on the outer race correctly. Further, after the securing, it is possible to facilitate to judge whether the accordion spring is secured to the predetermined position or not, thereby contributing enhancement of quality of the article.

Further, by providing the discriminating area 20 or 23, when the outer race 1 is attached to the associated member, a rivet inserting direction can easily be determined, thereby enhancing workability and preventing erroneous assembling. Further, since side plates which were used in the prior arts can be eliminated, most of pockets 4 are exposed, thereby enhancing the dust discharging ability from the pockets 4.

Since the accordion spring 5 is secured to the discriminating area 20 or 23 of the axial end face 21 of the outer race 1, a relative position between the accordion spring 5 and the outer race 1 is not almost changed. Thus, wear and/or damage of the spring caused by sliding contact between the spring and the inner diameter portion of the outer race and the outer diameter portion of the holder or the track surface of the inner race can be prevented.

Further, the movement of the accordion spring 5 during the operation thereof is not affected by the outer race 1 and/or the holder 6, so that a stable and smooth movement can be achieved. Thus, the engaging ability of the roller can be enhanced.

Although the present invention can be used as a part such as a torque transmitting element or a back stop in a driving apparatus of a motor vehicle, an industrial machine and the like, an excellent effect can be achieved particularly when the present invention is used in a motor bike.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

What is claimed is:

1. A one-way clutch of roller type comprising:
    an outer race having pockets provided at their inner peripheries with cam surfaces;
    an inner race arranged in an inner diameter side of said outer race coaxially;
    a plurality of rollers disposed in said pockets and adapted to transmit torque between said outer race and said inner race when engaged by said cam surfaces; and
    accordion springs disposed in said pockets between said outer race and said rollers and each having one end secured to an axial end face of said outer race, said accordion springs being adapted to bias said rollers toward engagement directions with respect to said cam surfaces;
    and wherein
    said axial end face of said outer race is provided with a discriminating area to which said accordion springs are secured, and said discriminating area is capable of being discriminated from other areas of said axial end face.

2. A one-way clutch of roller type according to claim 1, wherein said discriminating area is provided at an inner diameter side of said axial end face of said outer race and disposed concentrically with a rotational axis of said outer race.

3. A one-way clutch of roller type according to claim 2, wherein said discriminating area is formed as an annular shape.

4. A one-way clutch of roller type according to claim 1, wherein said discriminating area has surface roughness different from those of the other areas.

5. A one-way clutch of roller type according to claim 1, wherein said discriminating area is formed as a recessed portion.

6. A one-way clutch of roller type according to claim 5, wherein said discriminating area is formed as an annular shape.

7. A one-way clutch of roller type according to claim 1, wherein said accordion springs are secured to said outer race by spot welding.

8. A one-way clutch of roller type according to claim 1, further comprising a holder including a cylindrical portion having windows for holding said rollers, and a flange portion extending from said cylindrical portion radially outwardly and adapted to be engaged by a stepped portion provided at an inner diameter side of said outer race opposite to said axial end face, said holder being rotatable relative to said outer race.

* * * * *